United States Patent [19]
Clark et al.

[11] Patent Number: 5,796,419
[45] Date of Patent: Aug. 18, 1998

[54] SELF-SEALING FLUID INTERCONNECT

[75] Inventors: James E. Clark, Albany; David O. Merrill, Corvallis, both of Oreg.

[73] Assignee: Hewlett-Packard Company, Palo Alto, Calif.

[21] Appl. No.: 566,986

[22] Filed: Dec. 4, 1995

[51] Int. Cl.⁶ .................. B41J 2/175; F16K 51/00
[52] U.S. Cl. .................. 347/85; 347/86; 347/87; 251/149.6
[58] Field of Search .................. 347/85, 86, 87; 346/140.1, 140 R; 251/149.1, 149.6

[56] References Cited

U.S. PATENT DOCUMENTS

| | | | |
|---|---|---|---|
| 2,024,682 | 12/1935 | Eisenman | 284/19 |
| 2,411,057 | 11/1946 | Robbins | 284/19 |
| 2,412,685 | 12/1946 | Hoffman et al. | 284/19 |
| 4,114,853 | 9/1978 | Medvick | 251/149.6 |
| 5,544,858 | 8/1996 | Rogers et al. | 251/149.6 |
| 5,606,988 | 3/1997 | Pawlowski, Jr. | 251/149.1 |

FOREIGN PATENT DOCUMENTS

| | | | |
|---|---|---|---|
| 1808164 | 3/1960 | Germany | |
| 3003398 | 8/1980 | Germany | H05K 7/20 |
| 3137969 | 3/1983 | Germany | B41J 27/00 |
| 829531 | 3/1960 | United Kingdom | |

*Primary Examiner*—Peter S. Wong
*Assistant Examiner*—Rajnikant B. Patel

[57] ABSTRACT

A fluid interconnect between an ink supply and an ink-jet printer has an outlet assembly and an inlet assembly. The outlet assembly has a hollow tube with a lateral hole, a guide member and a sealing member with a catch. The inlet assembly has a poppet valve and at least one compliant finger. When the outlet assembly is inserted into the inlet assembly, the sealing member is moved from a closed position, in which the sealing member covers the lateral hole to occlude ink flow, into an open position, in which the lateral hole is exposed so that ink may flow through the outlet assembly. At the same time, the compliant finger engages the catch on the sealing member. As the outlet assembly is extracted from the inlet assembly, the compliant finger moves the sealing member back to a closed position to cover the lateral hole to occlude ink flow through the outlet assembly.

20 Claims, 13 Drawing Sheets

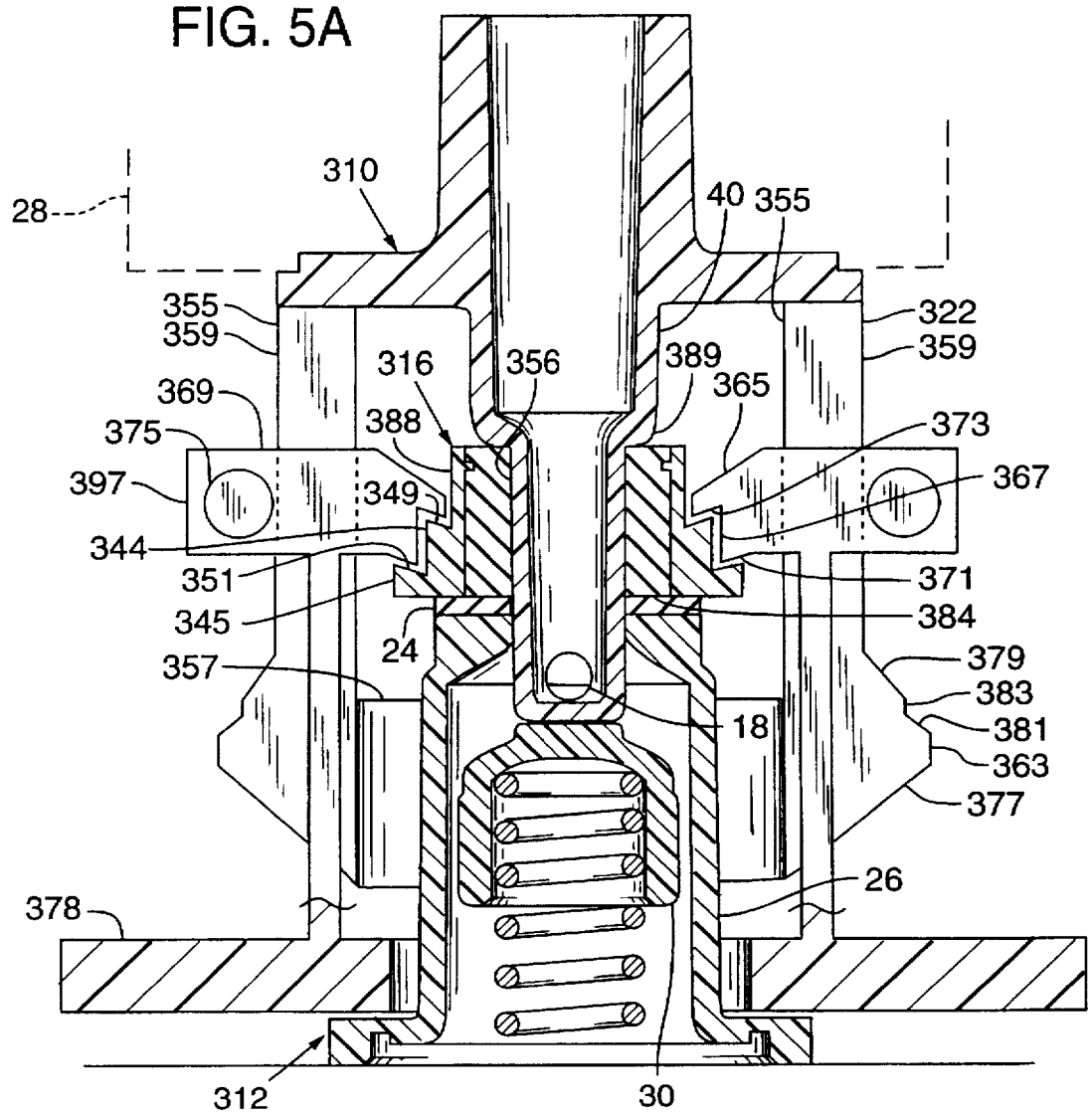

5,796,419

1

SELF-SEALING FLUID INTERCONNECT

TECHNICAL FIELD

This invention relates to a self-sealing fluid interconnect that can be used, for example, to connect an ink supply to an ink-jet printer.

DESCRIPTION OF THE RELATED ART

Ink-jet printers commonly have print heads that are moved over a sheet of paper, or some other material, and selectively eject tiny droplets of ink to form desired characters or images. In some ink-jet printers, a supply of ink is contained in a reservoir at the print head. This type of ink supply allows for the simple delivery of ink from the reservoir to the print head. However, because the reservoir is moved with the print head, the size of the reservoir may adversely affect printer speed. In other ink-jet printers, the ink supply is located elsewhere on the printer. This may allow the print head to traverse the paper at a greater speed. However, it also complicates the delivery of ink from the supply to the print head. Generally, in this latter type of printer, the ink is supplied from the reservoir to the print head by a trailing tube.

Although some printers use reservoirs that may be refilled when they are depleted, such reservoirs may collect dirt and other contaminants, which can impair the proper operation of the printer. Thus, it is often preferable to provide an ink supply that can be replaced upon depletion. To facilitate replacement of an ink supply, some ink-jet printers are provided with a docking station into which a replaceable ink supply can be mounted. Upon depletion of the ink supply, it can be extracted easily from the docking station and discarded, and a new ink supply can be inserted.

A fluid interconnect between the docking station and the ink supply is necessary. Otherwise ink may leak from the ink supply and damage or, at least, impair the function of the printer. It is important that the fluid interconnect provide a tight seal while the ink supply is inserted in the docking station and also that it prevent ink from escaping as the ink supply is uncoupled from the station. Such a fluid interconnect will ensure that little, if any, ink comes in contact with the user.

Generally, once the ink supply is removed from the station, it is discarded. Therefore, it is also desirable for the entire ink supply, including the fluid interconnect, to be recyclable.

Many current fluid interconnects for ink supplies are not easily recyclable because they have parts made of a variety of materials. Thus, the parts must be disassembled and separated before recycling. For example, one fluid interconnect provides a poppet valve on both the printer side and the ink supply side of the fluid interconnect. The poppet valve generally has a seat and a metal spring that must be disassembled and removed from the ink supply if the ink supply is to be recycled.

SUMMARY OF THE INVENTION

Accordingly, it is an object of this present invention to provide a self-sealing fluid interconnect that overcomes the shortcomings of current fluid interconnects.

It is a further object of the current invention to provide a self-sealing fluid interconnect that provides a reliable, robust seal and results in a minimum amount of trapped ink when the seal is broken.

It is yet another object of the invention to provide a self-sealing fluid interconnect that is easily recyclable and environmentally friendly.

2

In accordance with these and other objects of the present invention, a preferred embodiment of this invention has a valve with a catch on an outlet assembly of an ink supply and compliant fingers on an inlet assembly of a printer. The compliant fingers engage the catch upon insertion of the ink supply into the printer. Upon extraction of the ink supply from the printer, the compliant fingers pull the catch to move the valve on the ink supply into a closed position to occlude flow from the ink supply.

BRIEF DESCRIPTION OF THE DRAWINGS

FIG. 5A is a cross-sectional view a third embodiment of a self-sealing fluid interconnect in accordance with the present invention.

DESCRIPTION OF ILLUSTRATED EMBODIMENTS

Figure 1:
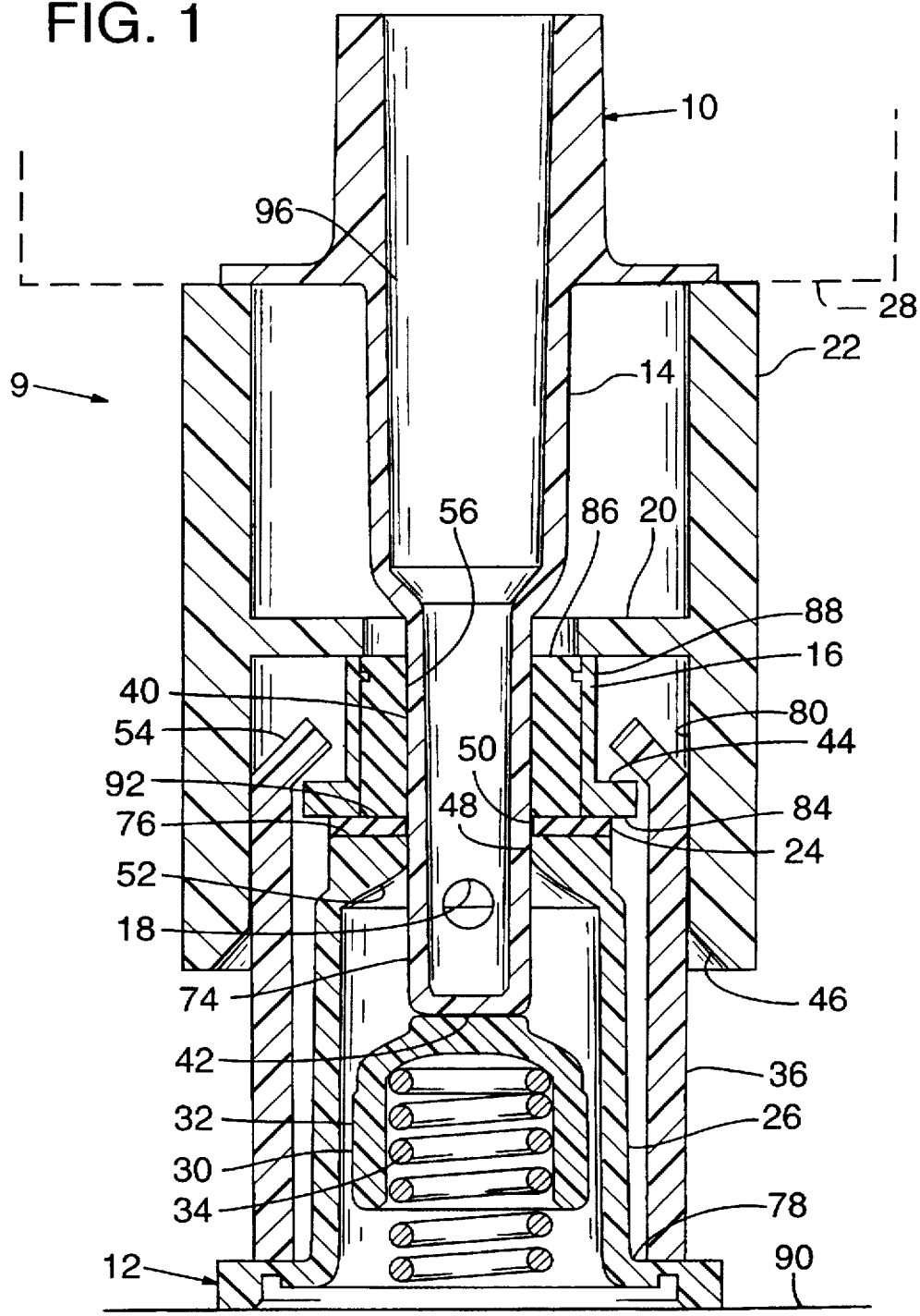
FIG. 1 is a cross-sectional view of a self-sealing fluid interconnect in accordance with a preferred embodiment of the present invention.

A fluid interconnect 9 for connecting an ink supply 28 to a printer station 90 is shown in FIG. 1. The illustrated fluid interconnect 9 has an outlet assembly 10 on the ink supply 28 and an inlet assembly 12 connected to the printer station 90. The outlet assembly 10 has an actuator 40, a sealing collar 16, and a retaining ring 22.

In the illustrated embodiment, the actuator 40 is a hollow tube 14 with a cap 42 on its lower end 74. A lateral hole 18 is provided near the lower end 74 to allow ink to flow out of the hollow tube 14. The upper end 96 of the hollow tube 14 is in fluid communication with the ink supply 28, and the lower end 74 is exposed for insertion into the inlet assembly 12. In the illustrated embodiment, the actuator 40 is manufactured from polyethylene, but it is envisioned that other materials could also be used.

The hollow tube 14 slidably fits through a bore 56 in the sealing collar 16. The sealing collar 16 has a substantially rigid portion 88 and a compliant portion 86. The rigid portion 88 has a primary catch 44 integrally formed therein and extending perpendicular from the axis of the tube 14. The compliant portion 86 is sized to provide a friction fit around the tube 14. Preferably, the rigid portion 88 is made of polyethylene, and the compliant portion 86 is made of an elastomer. In the illustrated embodiment, the rigid and compliant portions 88 and 86 are manufactured as a composite by manufacturing the rigid portion 88 and then allowing the compliant portion 86 to flow into the rigid portion 88 and fill in any voids, thereby locking the compliant portion 86 in the rigid portion 88.

Figure 2:
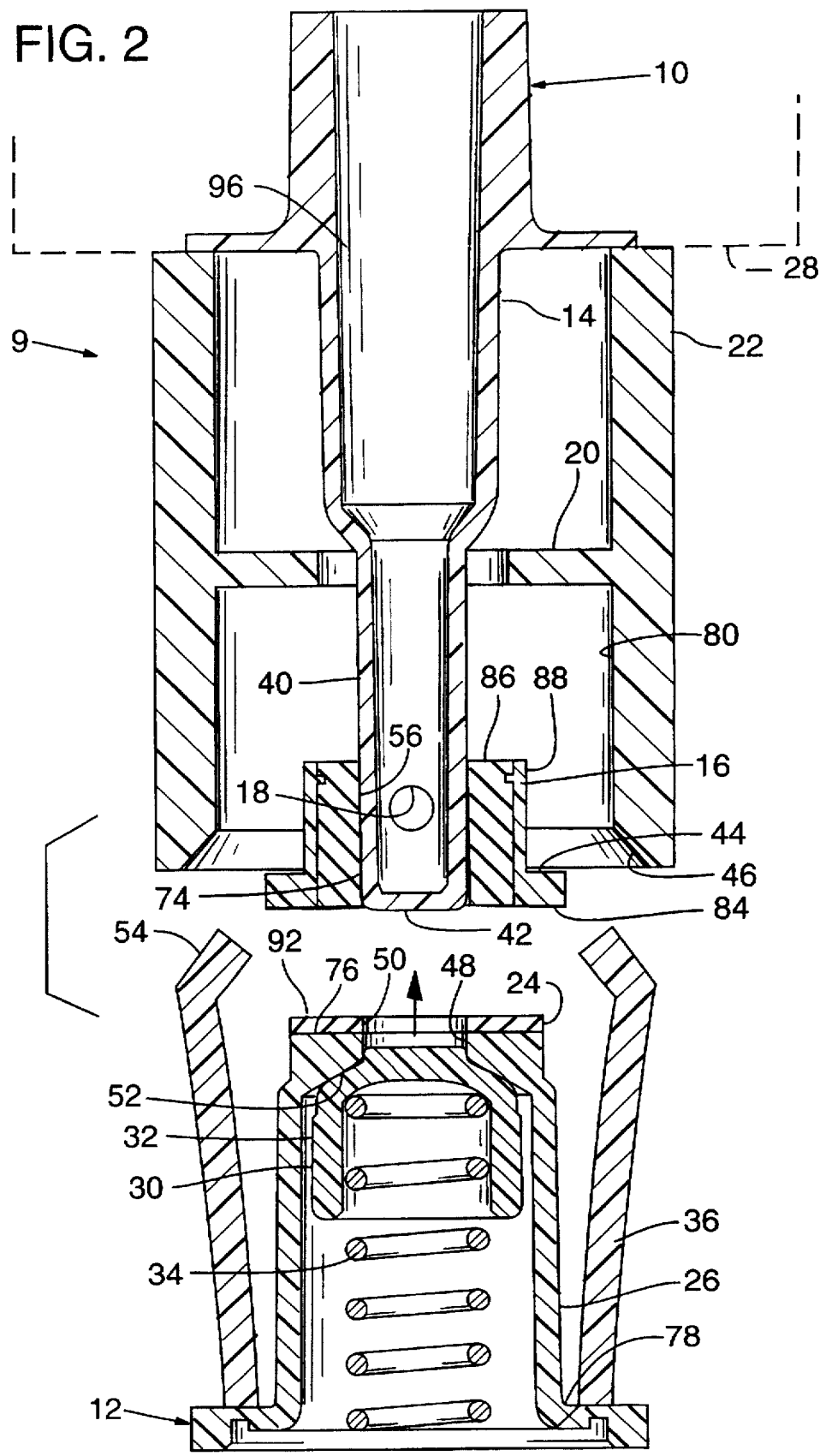
FIG. 2 is a cross-sectional view of the self-sealing fluid interconnect of FIG. 1 shown in the sealed, disconnected position.

The sealing collar 16 is slidable from a closed position, as shown in FIG. 2, in which the sealing collar 16 covers the lateral hole 18, into an open position, as shown in FIG. 1, in which the lateral hole 18 is exposed.

The retaining ring 22 is positioned around the tube 14 and the sealing collar 16. In the illustrated embodiment, the retaining ring 22 is ring-shaped. However, guide members of other shapes, such as rectangular projections, could be used instead of the retaining ring 22. The retaining ring 22 has an exposed end 46 that is chamfered. In the preferred embodiment, the retaining ring 22 is provided with a stop 20. The stop 20 extends into the interior of the retaining ring 22 in a direction perpendicular to the axis of the retaining ring 22. The stop 20 limits the travel of the sealing collar 16 on the hollow tube 14, as will become clear later.

The outlet assembly 10 is insertable into the inlet assembly 12. The inlet assembly 12 has a fitment 26, a poppet valve 30, and compliant fingers 36. As will be described in more detail below, the compliant fingers 36 move the sealing collar 16 into a closed position to occlude ink flow through the outlet assembly 10 when the outlet assembly 10 is removed from the inlet assembly 12.

The fitment 26 of the inlet assembly 12 can be either integrally formed with the printer or attached thereto by, for example, heat-staking or ultrasonic welding. The fitment 26 preferably is made from polyethylene.

The fitment 26 has an inlet aperture 48 extending from the end near the printer to the top exterior 76 of the fitment 26. The fitment 26 houses a poppet valve 30. The fitment 26 has a concave portion 52 shaped to be flush with the top of the poppet valve 30. The fitment 26 is in fluid communication with a trailing tube (not shown) connected to the printer station 90. The top exterior 76 of the fitment 26 is provided with a sealing element 24. The sealing element 24 has an opening 50 sized to fit the diameter of the hollow tube 14. However, the sealing element 24 could be located on the bottom of the sealing collar 16 rather than on the fitment 26.

The poppet valve 30 is composed of a seat 32 and a spring 34. The spring 34 biases the seat 32 into a closed position against the concave portion 52 of the fitment 26. The seat 32 is pressed into an open position by the tube 14 when the outlet assembly 10 is coupled with the inlet assembly 12. In the illustrated embodiment, the seat is polyethylene, and the spring is metal, but various other materials may be used.

The inlet assembly 12 has two compliant fingers 36 attached to the base 78 of the fitment 26. The compliant fingers 36 extend along the outside of the fitment 26 and have hooks 54 that jut radially inward above the top of the fitment 26. The compliant fingers 36 may be made of metal, higher modulus plastic, polysulfone, or an equivalent material. As explained more fully below, the compliant fingers 36 move the sealing collar 16 into a closed position when the outlet assembly 10 is extracted from the inlet assembly 12.

It is also contemplated that the outlet assembly 10 could have a sealing component (not shown) on the exposed face 84 of the sealing collar 16 to ensure a robust seal between the inlet assembly 12 and the outlet assembly 10 before the assemblies 10 and 12 are opened for ink flow.

The illustrated embodiment shows the outlet assembly 10 on the ink supply and the inlet assembly 12 on the printer; however, the location of the outlet and inlet assemblies 10 and 12 could be reversed.

Upon insertion of the outlet assembly 10 into the inlet assembly 12, the hooks 54 of the compliant fingers 36 press against the chamfered end 46 of the retaining ring 22. The elasticity of the compliant fingers 36 allows the compliant fingers 36 to be guided by the chamfered end 46 into the interior 80 of the retaining ring 22. Once the compliant fingers 36 are inside the retaining ring 22, the hooks 54 of the compliant fingers 36 engage the primary catch 44 on the sealing collar 16. The face 92 of the sealing element 24 of the inlet assembly 12 contacts the bottom of the sealing collar 16. The sealing element 24 conforms to the shape of the sealing collar, and a seal is formed between the outlet assembly 10 and the inlet assembly 12. This seal is established before the outlet and inlet assemblies 10 and 12 are opened for ink flow. The engagement of the fingers 36 on the primary catch 44 slightly pulls the outlet and inlet assemblies 10 and 12 closer together to form a tighter seal. The sealing element 24 pushes the sealing collar 16 from the closed position upward along the tube 14 until the sealing collar 16 hits the stop 20, at which point the lateral hole 18 is exposed within the inlet aperture 48 and ink can flow through the outlet assembly 10 into the inlet assembly 12. At the same time, the lower end 74 of the tube 14 moves the poppet valve 30 to allow ink to flow through the inlet assembly 12.

When the outlet assembly 10 is extracted from the inlet assembly 12, the hooks 54 on the compliant fingers 36 pull downward on the primary catch 44 of the sealing collar 16. The downward pulling moves the sealing collar 16 from the open position downward along the tube 14 until the walls of the bore 56 in the sealing collar 16 completely cover the lateral hole 18. At this point, the sealing collar 16 is in the closed position, and ink is prevented from flowing through the outlet assembly 10. The compliant fingers 36 and the retaining ring 22 are dimensioned so that once the sealing collar 16 covers the lateral hole 18, the hooks 54 are at the end 46 of the retaining ring 22 and further outward movement of the outlet assembly 10 allows the compliant fingers 36 to spring outward to their free position, thus disengaging the primary catch 44 on the sealing collar 16. As a result, the sealing collar 16 remains over the lateral hole 18, preventing ink flow through the outlet assembly 10.

Also, as the outlet assembly 10, and thus the hollow tube 14, is extracted from the inlet assembly 12, the spring 34 forces the seat 32 upward to return to its closed position.

Once both the outlet and inlet assemblies 10 and 12 are closed, the seal that was formed between the sealing element 24 on the inlet assembly 12 and the sealing collar 16 on the outlet assembly 10 is broken. Preferably, as in the illustrated embodiment, the shape of the inlet assembly 10 and the shape of the outlet assembly 12 generally conform to each other in the region where they join. As a result, the volume of ink trapped between the outlet and inlet assemblies 10 and 12 is negligible. Thus, the preferred embodiment of this invention provides a clean disconnect with very little ink released.

The present invention provides a simple outlet assembly for an ink supply. The outlet assembly has a minimum number of parts, and the parts are made of similar materials, thus making the ink supply easy to recycle. The outlet assembly of the present invention is closed by the compliant fingers, which are located on the inlet assembly.

Furthermore, this invention provides a reliable, robust seal for a fluid interconnect. The tight seal ensures that little air becomes trapped between the inlet and outlet assemblies when the assemblies are opened for ink flow and likewise ensures that little ink remain between the inlet and outlet assemblies during extraction of the outlet assembly from the inlet assembly. Thus, little air is ingested during insertion of the outlet assembly into the inlet assembly, and little ink can come in contact with the user or contaminate the printer.

Figure 3:
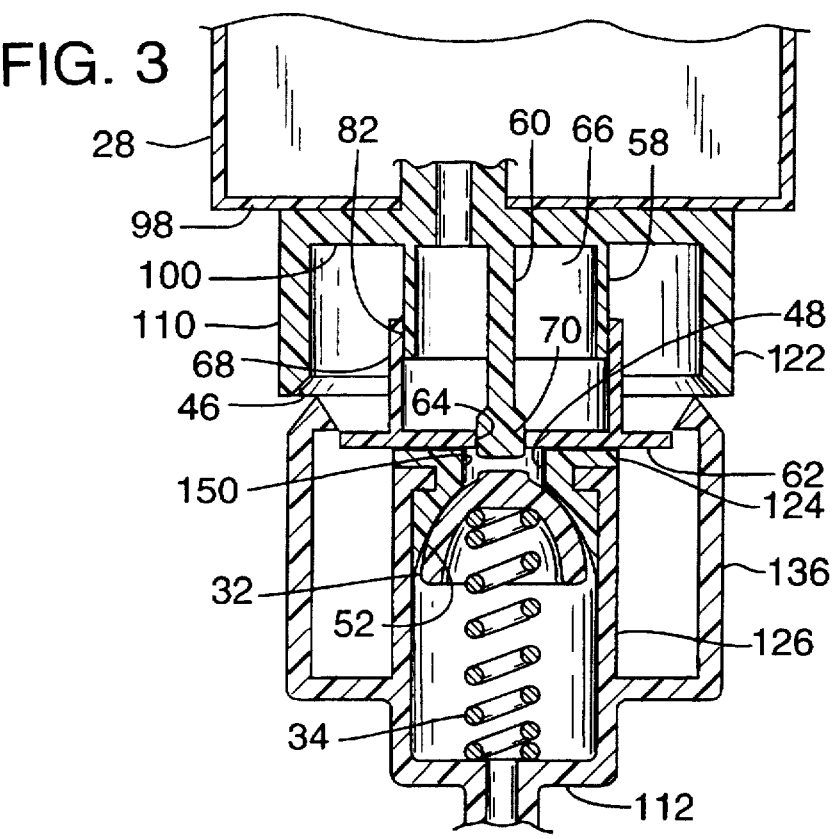
FIG. 3 is a cross-sectional view of an alternative embodiment of a self-sealing fluid interconnect in accordance with the current invention.
Figure 4:
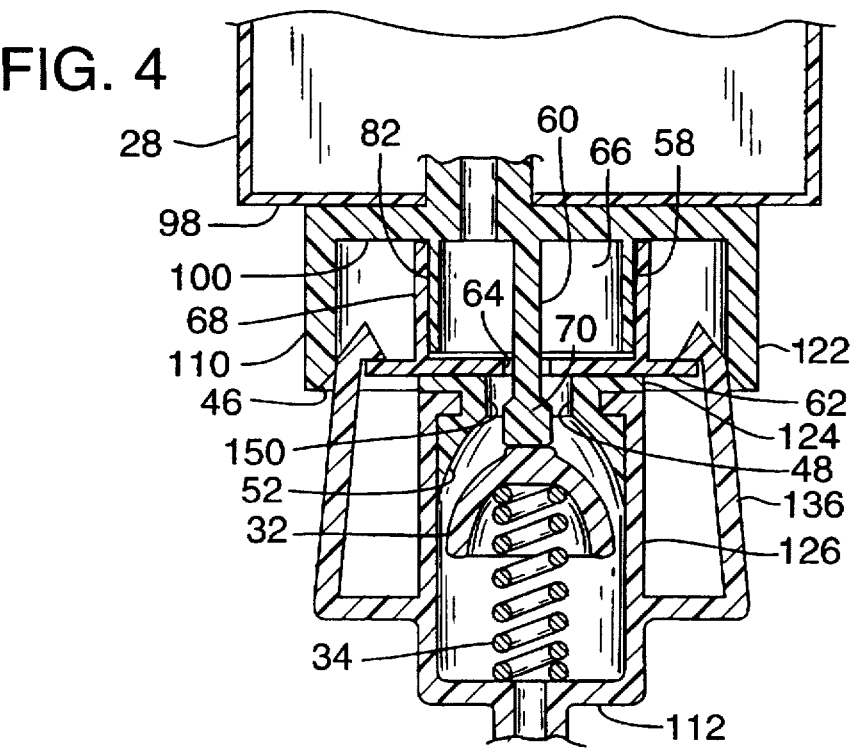
FIG. 4 is a cross-sectional view of the self-sealing fluid interconnect of FIG. 3 shown in the unsealed, connected position.

FIGS. 3 and 4 show an alternative embodiment of this invention. The outlet assembly of the alternative embodiment 110 has a valve body 58, a projection 60, a sealing member 62, and a retaining ring 122. The valve body 58, the projection 60, and the retaining ring 122 are made from polyethylene in the illustrated embodiment. The sealing member 62 of the depicted embodiment is made from ethylene-propylene-dimer monomer.

The valve body 58 is generally a hollow cylindrical member extending outward from the base 98 of the ink supply 28. The valve body 58 may be attached to the ink supply 28 by a method such as heat-staking or ultrasonic welding.

The sealing member 62 is generally disk-shaped with a cylindrical sleeve 68 extending from a location radially inward from the perimeter of the sealing member 62 outwardly along the axis of the sealing member 62 to fit around the bottom portion 82 of the valve body 58. The valve body 58 and the sleeve 68 are dimensioned so that friction holds the sleeve 68 in position around the valve body 58 and forms a secure seal to prevent ink from leaking between the two. Together, the valve body 58 and the sealing member 62 define a cavity 66 that is in fluid communication with the ink supply 28. The sealing member 62 also has a hole 64.

The projection 60 is attached to the base 98 of the ink supply 28 by heat-staking or ultrasonic welding and extends from the base 98 into the cavity 66. In the illustrated embodiment, the projection is enlarged near its end to form a head 70. The head 70 is sized to provide a friction fit inside the hole 64 of the sealing member 62.

When the outlet assembly 110 and the inlet assembly 112 are uncoupled, the sealing member 62 is in a closed position in which the head 70 seals the hole 64 to occlude fluid flow through the outlet assembly 110, as shown in FIG. 3. When the outlet assembly 110 is inserted into the inlet assembly 112, the sealing member 62 slides from the closed position, up the axis of the projection 60 to an open position, as shown in FIG. 4. In the open position, the sealing member 62 no longer surrounds the head 70 but rather surrounds the projection 60, which is narrower than the head 70, thus opening a fluid path from the cavity 66 to the inlet assembly 112.

The inlet assembly 112 has a sealing element 124 with an opening 150 that is sized to accommodate the head 70 of the projection 60 so that when the head 70 is extended into the opening 150 an annulus exists for flow between the head 70 and sealing element 124.

Upon insertion of the outlet assembly 110 into the inlet assembly 112, the compliant fingers 136 are guided by the end 46 of the retaining ring 122 into the interior of the retaining ring 122. The compliant fingers 136 engage the sealing member 62. Simultaneously, the sealing element 124 contacts the face of the sealing member 62 to form a seal between the outlet and inlet assemblies 110 and 112. The sealing element 124 pushes the sealing member 62 along the outside of the valve body 58 until the top of the sleeve 68 abuts the upper interior 100 of the valve body 58. As the sealing member 62 is pushed, the projection 60 presses the seat 32 off the concave portion 52 into the fitment 126. In this position, a fluid path is opened between the ink supply 28, the cavity 66, the hole 64, the opening 150, and the inlet aperture 48, thus allowing ink to flow from the ink supply 28 into the inlet assembly 112.

When the outlet assembly 110 is extracted from the inlet assembly 112, the compliant fingers 136 move the sealing member 62 from the open position to the closed position. As the outlet assembly 110 is extracted, the projection 60 is extracted, causing the spring 34 to force the seat 32 into its closed position. Once both the outlet and inlet assemblies 110 and 112 are in the closed position, the sealing element 124 disengages the sealing member 62, which breaks the seal formed between the outlet and inlet assemblies 110 and 112. Closing the outlet and inlet assemblies 110 and 112 before the seal is broken ensures the only ink that can come in contact with the user is the minimal amount remaining in the annulus.

FIGS. 5A–F and 6 show a third alternative embodiment of a self-sealing fluid interconnect, indicated by reference number 309. The outlet assembly 310 of the alternative embodiment has an actuator 40, a sealing collar 316, and a guide member 322.

The hollow tube 14 slidably fits through a bore 356 in the sealing collar 316. The sealing collar 316 has a substantially rigid portion 388 and a compliant portion 386. The rigid portion 388 has a primary catch 344 and a safety catch 345. The primary catch 344 protrudes radially from the center of the exterior walls of the sealing collar 316. The safety catch 345 extends radially from the bottom of the exterior walls of the sealing collar 316 and has a larger outer diameter than the primary catch 344. In the illustrated embodiment, the top surfaces 349 and 351 of the primary and safety catches 344 and 345, respectively, slope radially inward at a fifteen degree angle. The sloped top surfaces 349 and 351 help insure that the fingers 336 remain engaged with the top surfaces 349 and 351 while the outlet assembly 310 is extracted from the inlet assembly 312, as will become clear later.

Figure 5B:
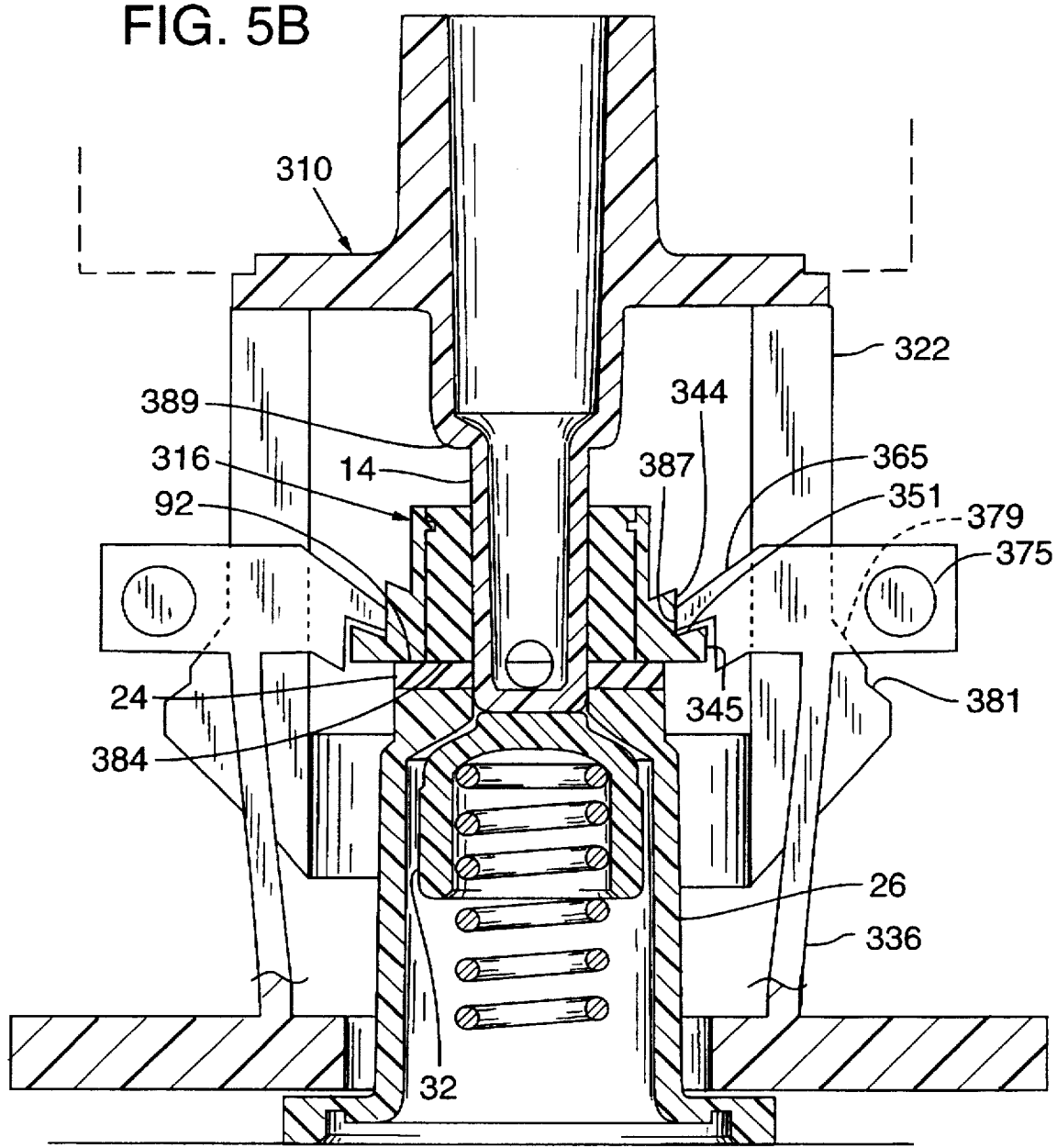
FIG. 5B is a cross-sectional view of the self-sealing fluid interconnect of FIG. 5A, shown in a partially connected position.
Figure 5C:
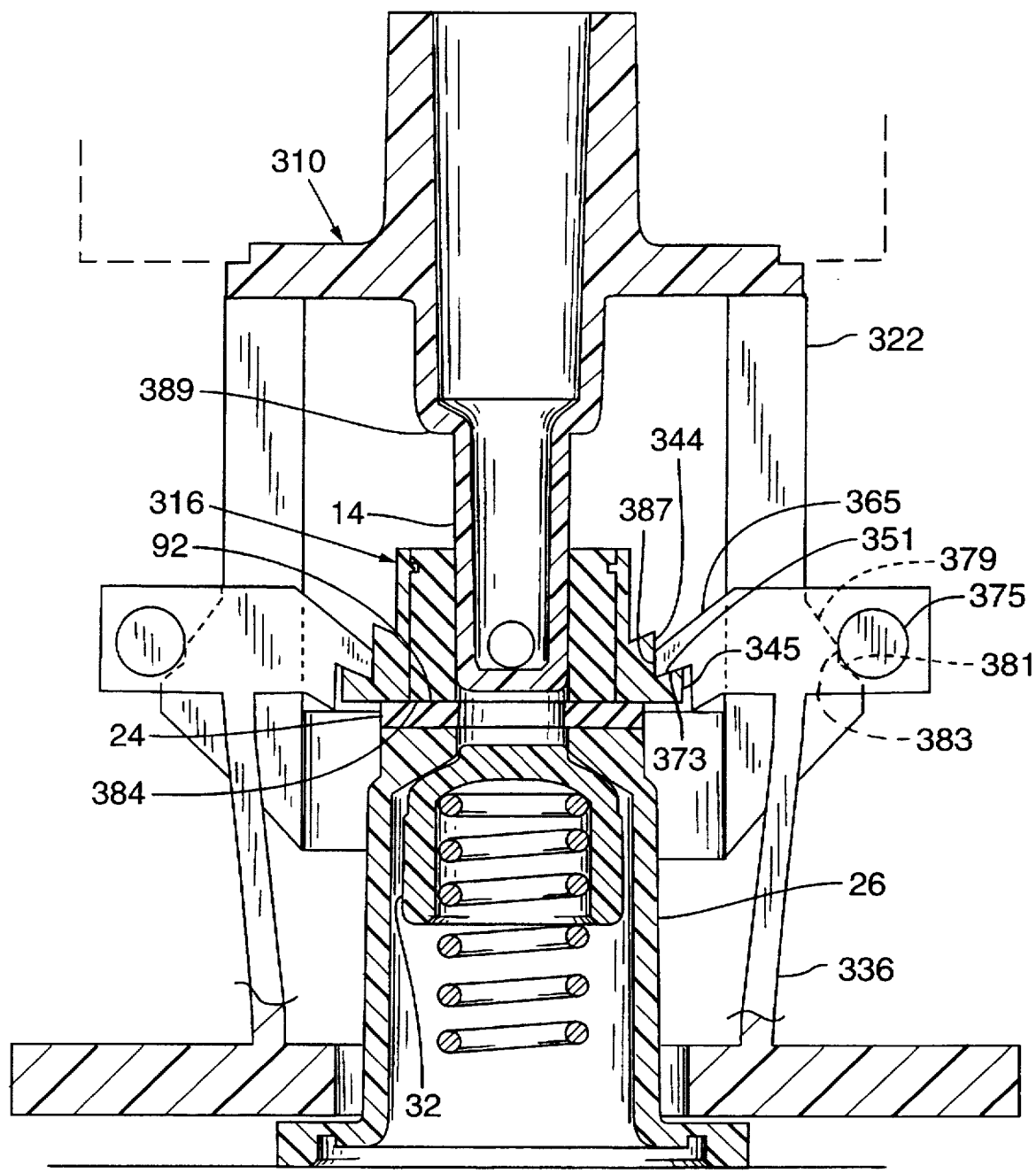
FIG. 5C is a cross-sectional view of the self-sealing fluid interconnect of FIG. 5A, shown in a position with the top tooth of the fingers engaged with the safety catch.
Figure 5D:
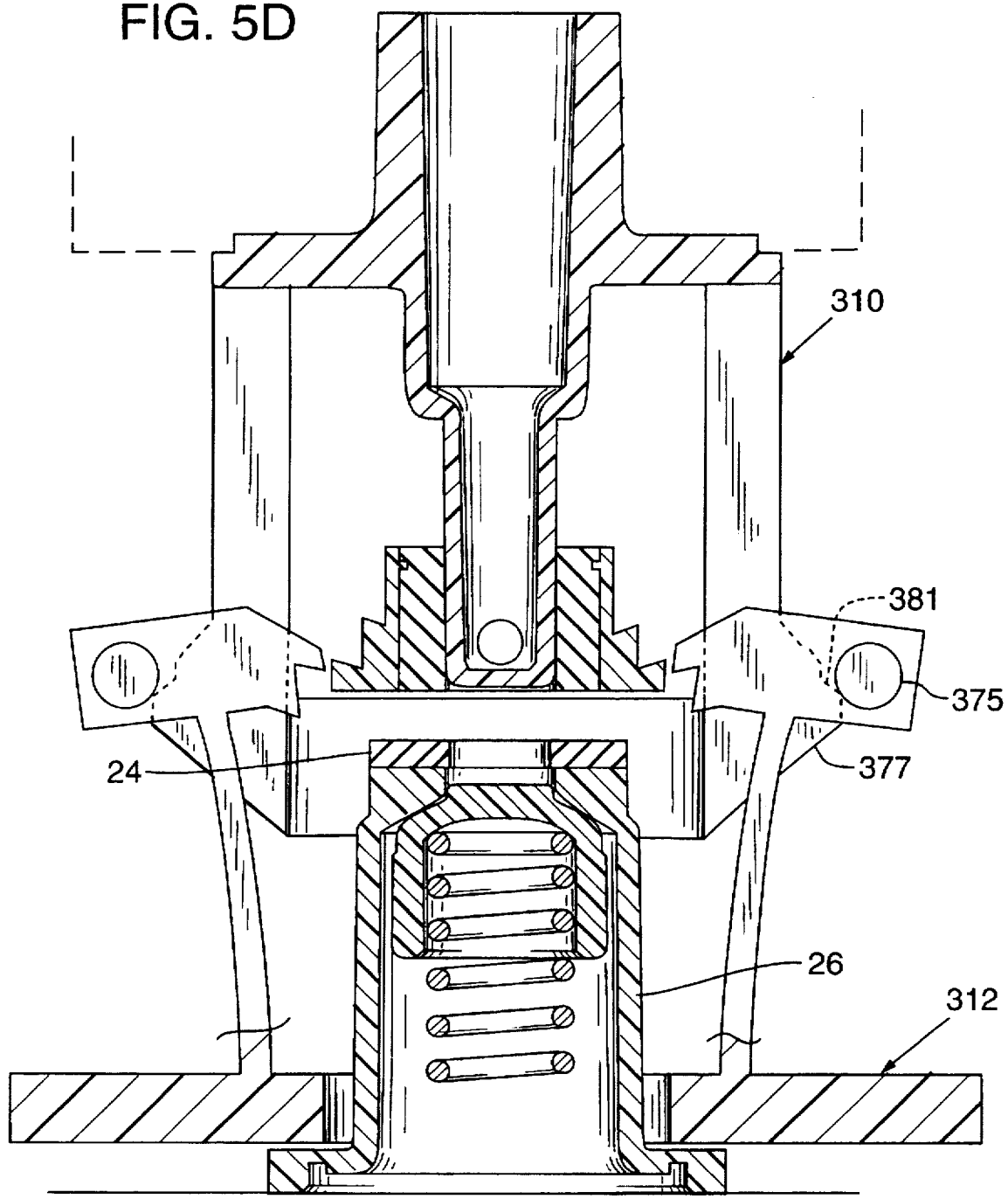
FIG. 5D is a cross-sectional view of the self-sealing fluid interconnect of FIG. 5A, shown in a position prior to engagement of the fingers on the safety catch.
Figure 5E:
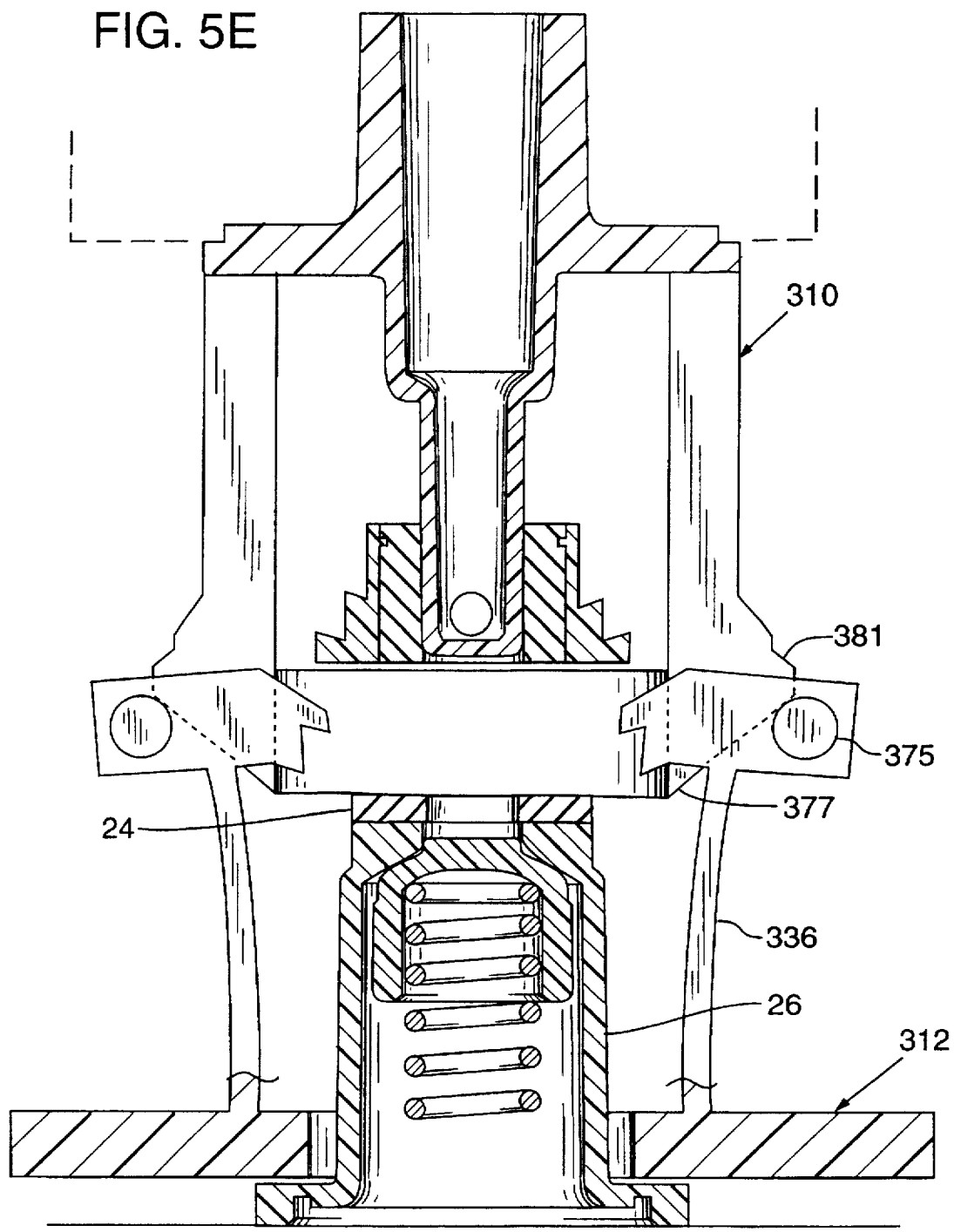
FIG. 5E is a cross-sectional view of the self-sealing fluid interconnect of FIG. 5A, shown in a position in which the cam follower is following the lower cam surface.
Figure 5F:
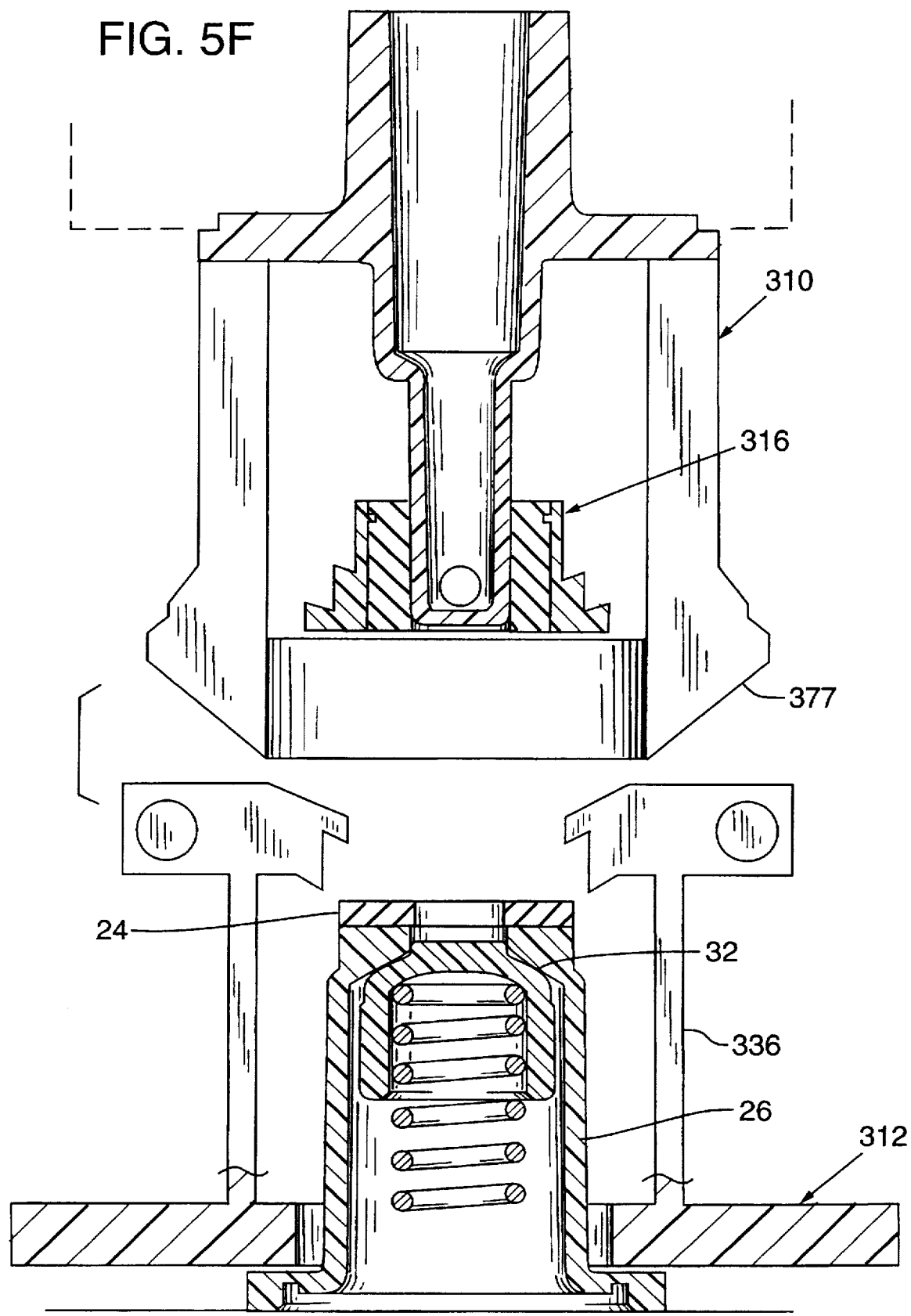
FIG. 5F is a cross-sectional view of the self-sealing fluid interconnect of FIG. 5A, shown in the sealed, disconnected position.

The sealing collar 316 is slidable from a closed position, as shown in FIG. 5F, in which the sealing collar 316 covers the lateral hole 18 to occlude flow from the outlet assembly 310, into an open position, as shown in FIG. 5A, in which the lateral hole 18 is exposed within the inlet assembly 312 to open a path for fluid flow between the outlet assembly 310 and the inlet assembly 312.

Figure 6:
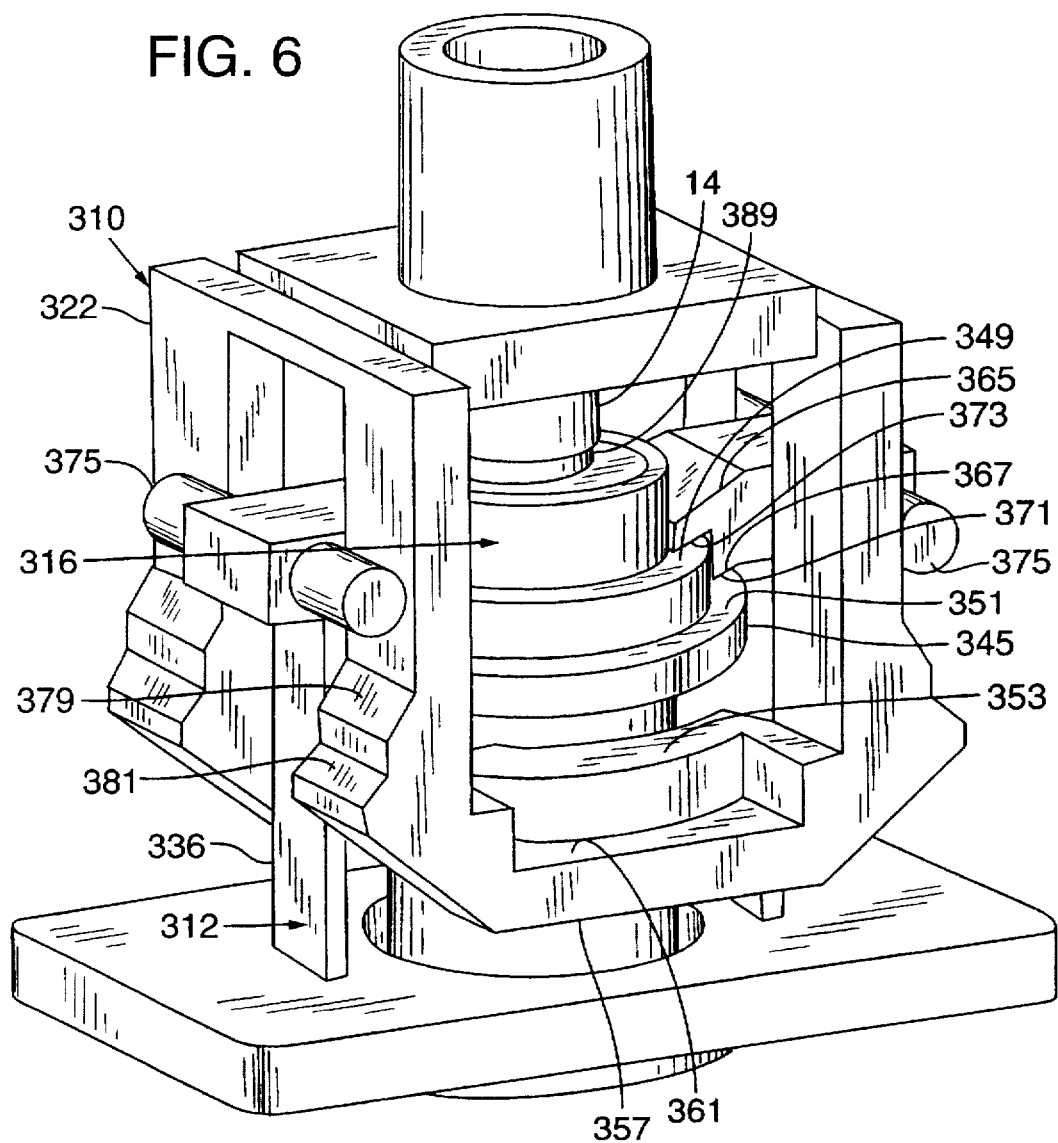
FIG. 6 is a perspective view of the self-sealing fluid interconnect of FIG. 5.

The guide member 322 is positioned around the tube 14 and the sealing collar 316. As seen in FIGS. 5A and 6, the illustrated guide member 322 is frame-shaped with four legs 355 extending downwardly perpendicular to the base of the ink supply 28. The pair of fore legs and the pair of aft legs are each connected by a bridge 357 at the end of the legs 355. Each bridge 357 has a recess 361 with an arcuate stop 353 protruding therein, as best illustrated in FIG. 6. The face of the stop 353 is aligned with the exposed face 384 of the sealing collar 316 so that the stop 353 limits the downward travel of the sealing collar 316 on the hollow tube 14.

The outer surface 359 of each leg 355 has a cam 363 integrally formed thereon. The cam 363 protrudes outward from near the middle of the leg 355 and slopes downwardly to form an upper step 379. The bottom of the upper step 379 has a vertical surface 383. A lower step 381 protrudes outward and downward from the bottom of the vertical surface of the upper step 379. The cam 363 then angles inward to the bridge 357 to form a lower cam surface 377. The cam 363 guides the fingers 336 from a disengaged position into an engaged position in which the fingers 336 engage the sealing collar 316, as described in more detail below.

The outlet assembly 310 is insertable into the inlet assembly 312. The inlet assembly 312 has a fitment 26, a poppet valve 30, and compliant fingers 336. As will be described in more detail below, when the outlet assembly 310 is removed from the inlet assembly 312, the compliant fingers 336 move the sealing collar 316 into a closed position to occlude ink flow through the outlet assembly 310. The compliant fingers 336 move the sealing collar 316 into the closed position even if the outlet assembly 310 is only partially inserted into the inlet assembly 312.

The two compliant fingers 336 are attached to a base 378 that surrounds the fitment 26. The compliant fingers 336 extend along the outside of the fitment 26 and have a top tooth 365 and a bottom tooth 367. The bottom tooth 367 juts inward and downward from the upper region 365 of the finger 336. The bottom surface 371 of the bottom tooth 367 extends downward at a fifteen degree angle so as to fit against the top surfaces 349 and 351 of the primary and safety catches 344 and 345. The top tooth 365 protrudes from the bottom tooth 367 further inward and also has a bottom surface 373 that slopes at a fifteen degree angle to match the top surfaces 349 and 351.

The fingers 336 are spring-loaded to urge the fingers 336 inward toward the fitment 26. The fingers 336 have rectangular extensions 397 protruding from the upper region 369 in an opposite direction as that of the top and bottom teeth 365 and 367. The rectangular extensions 397 have a cam follower 375. In the illustrated embodiment, the cam follower 375 is composed of two cylinders, each having an axis extending perpendicular from the sides of the fingers 336; although other shapes could be used for cam followers. The cam follower 375 rides along the cam 363 to guide the fingers 336 from the disengaged position to the engaged position, as will become clear below.

When the outlet and inlet assemblies 310 and 312 are not engaged, the sealing collar 316 and the seat 32 are in the closed position, as shown in FIG. 5F. As the outlet assembly 310 is positioned around the inlet assembly 312, and while the sealing collar 316 and the seat 32 are still in closed positions, the cam follower 375 on the finger 336 contacts the lower cam surface 377. As the outlet assembly 310 is further depressed around the inlet assembly 312, the cam follower 375 rides upward and outward along the lower cam surface 377, causing the finger 336 to deflect outward also, as shown in FIG. 5E.

When the cam follower 375 reaches the lower step 381, the follower 375 is no longer being forced outward, and thus the spring-loading of the finger 336 causes the finger to move inward along the lower step 381, as shown in FIG. 5D. When the cam follower 375 reaches the top of the lower step 381, the bottom surface 373 of the top tooth 365 engages the top surface 351 of the safety catch 345, as shown in FIG. 5C. In this position, the face 92 of the seal 24 on the fitment 26 contacts the exposed face 384 of the sealing collar 316 but the tube 14 has not yet contacted the seat 32, and therefore the sealing collar 316 and the seat 32 are still in the closed position.

As the outlet assembly 310 is further inserted into the inlet assembly 312, the cam follower 375 rides up the vertical surface 383, and the top tooth 365 disengages the safety catch 345.

The seal 24 begins to move the sealing collar 316 upward along the hollow tube 14 to begin to uncover the hole 18, and the tube 14 begins to unseat the seat 32, as shown in FIG. 5B. At this point, the outlet assembly 310 is partially inserted into the inlet assembly 312. As the outlet assembly 310 moves downward in FIG. 5B, the tip 387 of the top tooth 365 rides along the exterior wall of the primary catch 344 and the cam follower 375 is not in contact with the guide member 322.

The usual practice at this point is to continue inserting the outlet assembly 310 into the inlet assembly 312 until full insertion is achieved. However, even if the outlet assembly 310 is extracted from the inlet assembly 312 at this point, the fingers 336 would move the sealing collar 316 into the closed position. Extracting the outlet assembly 310 would cause the top surface 351 of the safety catch 345 to contact the top tooth 365, pulling the sealing collar 316 downward along the tube 14 to the closed position, in which the sealing collar 316 covers the hole 18. At about the same time, the cam followers 375 reach the lower step 381, which deflects the fingers 336 outward. The deflection of the fingers 336 disengages the top tooth 365 from the safety catch 345, leaving the sealing collar 316 in the closed position. The face 92 of the seal 24 and the exposed face 384 of the sealing collar 316 would disengage.

In normal operation, however, when the outlet assembly 310 is in the partially inserted position, shown in FIG. 5B, the outlet assembly 310 is further inserted into the inlet assembly 312. Further insertion causes the sealing collar 316 to rise to the top of the hollow tube 14 until the sealing collar 316 is abutting the ridge 389 of the tube 14. The seal 24 then compresses, which allows the fingers 336 to move upward relative to the sealing collar 316. As the fingers 336 rise, the top and bottom teeth 365 and 367 momentarily rise above the primary and safety catches 344 and 345, as shown in FIG. 5A. Then, the top teeth 365 engage the top surface 349 of the primary catch 344, as shown in FIG. 6. At the same time, the bottom teeth 367 engage the top surface 351 of the safety catch 354. This is the fully connected position.

When the outlet assembly 310 is extracted from the fully connected position (shown in FIG. 6), the guide member 322 and the hollow tube 14 move upward relative to the inlet assembly 312. The fingers 336 remain stationary and because the top and bottom teeth 365 and 367 are engaged with the primary and safety catches 344 and 345, the top and bottom teeth 365 and 367 exert pressure on the primary and safety catches 344 and 345, forcing the sealing collar 316 to remain in place as the hollow tube 14 is moved upward. When the hollow tube 14 has moved sufficiently upward so that the sealing collar 316 is covering the lateral hole 18 (in other words, the sealing collar 316 is in the closed position) the cam follower 375 reaches the upper step 379 and is deflected outward by the upper step 379, causing the top and bottom teeth 365 and 367 to disengage the top surfaces 349 and 351 of the primary and safety catches 344 and 345.

As the outlet assembly 310 is further extracted, the bottom surface 373 of the top tooth 365 momentarily engages the top surface 351 of the safety catch 345 before the lower step 381 engages the cam follower 375 and thereby deflects the fingers 336 further outward. The fingers 336 are now fully disengaged from the sealing collar 316.

As the outlet assembly 310 is further extracted, the cam follower 375 follows the lower cam surface 377 until the outlet assembly 310 is fully disengaged from the inlet assembly 312.

Figure 7:
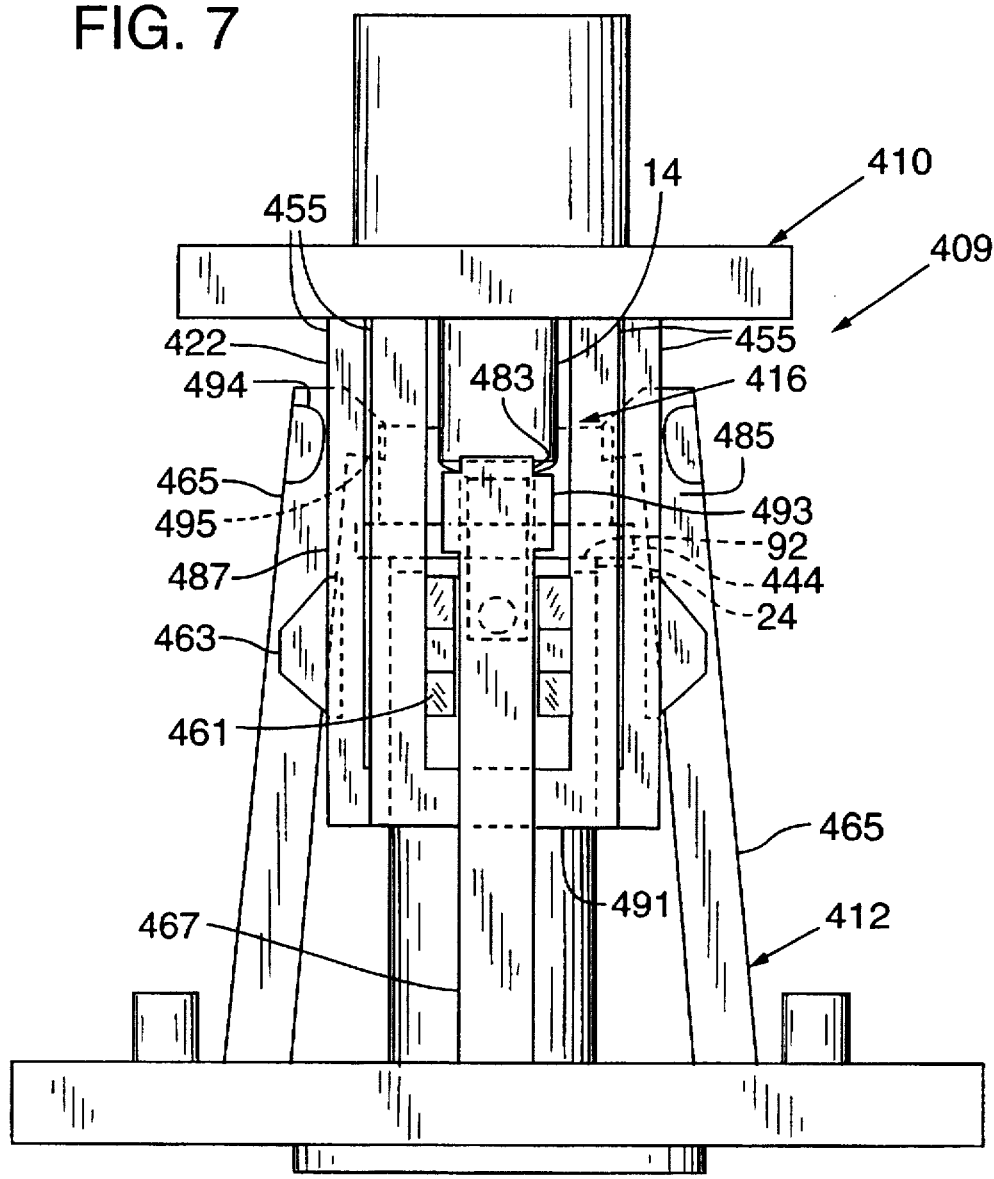
FIG. 7 is a perspective view of a fourth embodiment of a self-sealing fluid interconnect in accordance with the current invention, with the guide member omitted for clarity.

A fourth embodiment of a self-sealing fluid interconnect is shown in FIG. 7 as reference number 409. The inlet assembly 412 has two safety fingers 465 and two primary fingers 467.

The outlet assembly 410 has a sealing collar 416 with one catch, a primary catch 444. The outlet assembly 410 also has a guide member 422 with four "U"-shaped members 491. The legs 455 of the "U"-shaped member 491 are positioned so that when the inlet assembly 412 is inserted into the outlet assembly 410, the safety and primary fingers 465 and 467 fit in the space between the two legs 455 of each "U"-shaped member 491. Each leg adjacent to a safety finger 465 has a safety cam 463; likewise, each leg adjacent to a primary finger 467 has a primary cam 461. The safety and primary cams 463 and 461 are trapezoidal-shaped and extend outward from the corresponding legs 455.

The upper sides 485 of each of the safety fingers 465 have two safety cam followers 494 protruding therefrom. The upper sides 483 of each of the primary fingers 467 also have two primary cam followers 493 protruding therefrom. The protruding portion of the safety and primary cam followers 494 and 493 are semi-oval shaped.

Figure 8:
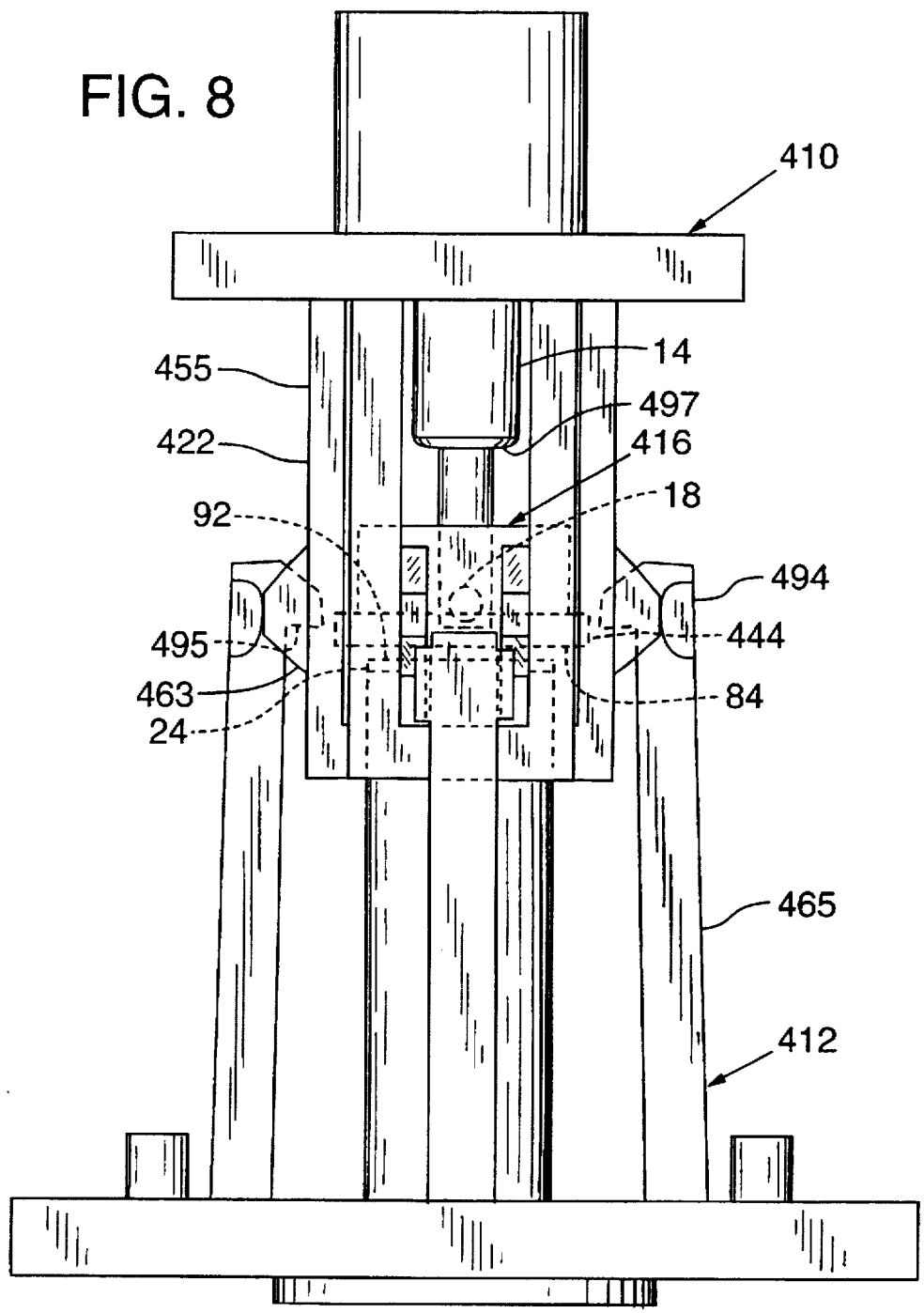
FIG. 8 is a cross-sectional view of the self-sealing fluid interconnect of FIG. 8, shown in the sealed position, prior to engagement of the safety fingers on the primary catch.

As the outlet assembly 410 is inserted into the inlet assembly 412, the safety cam followers 494 on the safety fingers 465 engage the lower surfaces of the safety cams 463, causing the safety fingers 465 to be deflected outward. The safety cam followers 494 ride along the vertical surface of the safety cams 463 and then along the upper surface of the safety cams 463. As the safety cam followers 494 ride along the upper surface, the safety fingers 465 spring inward, and when the safety cam followers 494 reach the outer vertical surface of the legs 487 the tooth 495 engages the primary catch 444. At this point, the face 92 of the seal 24 has not mated with the exposed face 84 of the sealing collar 416, as can be seen in FIG. 8.

Further insertion of the outlet assembly 410 into the inlet assembly 412 causes the safety cam followers 494 to ride along the vertical outer surface of the legs 455. The upward movement of the safety fingers 465 relative to the guide member 422 and hollow tube 14 cause the teeth 495 to disengage the primary catch 444. The face 92 of the seal 24 then presses against the exposed face 84 of the sealing collar 416, moving the sealing collar 416 upward along the hollow tube 14 to begin to expose the lateral hole 18.

Even though the outlet assembly 410 is not fully inserted into the inlet assembly 412, removing the outlet assembly 410 from the inlet assembly while in this position will cause the sealing collar 416 to return to the closed position. The teeth 495 on the safety fingers 465 will come into contact with the top surface of the primary catch 444 and will hold the sealing collar 416 in place until the sealing collar 416 has covered the lateral hole 18; at which point, the safety cam follower 494 will contact the safety cam 463, which will deflect the safety fingers 465 from the primary catch 444, leaving the sealing collar 416 in the closed position.

In normal operation, though, the outlet assembly 410 is further inserted from the partially connected position to the fully connected position. As this occurs, the face 92 of the seal 24 will continue to press on the exposed face 84 of the sealing collar 416 to further push the sealing collar 416 upward along the hollow tube 14. The primary cam follower 493 rides over the primary cam 461. The sealing collar 416 reaches the ridge 497 on the hollow tube 14, which limits the upward travel of the sealing collar 416, as shown in FIG. 7. The seal 24 compresses, and thus the primary fingers 467 disengage and move upward relative to the sealing collar 416. The primary fingers 467 spring inward to engage the primary catch 444, as shown in FIG. 7.

Upon extraction of the outlet assembly 410 from the inlet assembly 412, the teeth 495 on the primary fingers 467 will keep the sealing collar 416 stationary as the hollow tube 14 is moved upward. When the hollow tube 14 has moved up a sufficient distance so that the sealing collar 416 is covering the lateral hole 18 (in the closed position), the primary cam followers 493 on the primary fingers 467 contact the top surface of the primary cams 461, thereby being deflected outward to release the primary catch 444 on the sealing collar 416. Thus, the sealing collar 416 is left in the closed position.

Also, as the outlet assembly 410 is further extracted from the inlet assembly 412, the teeth 495 on the safety fingers 465 will momentarily contact the primary catch 444 before the safety fingers are guided by the safety cams 463 to disengage the sealing collar 416. The momentary contact will not move the sealing collar 416, at least not significantly.

Figure 9:
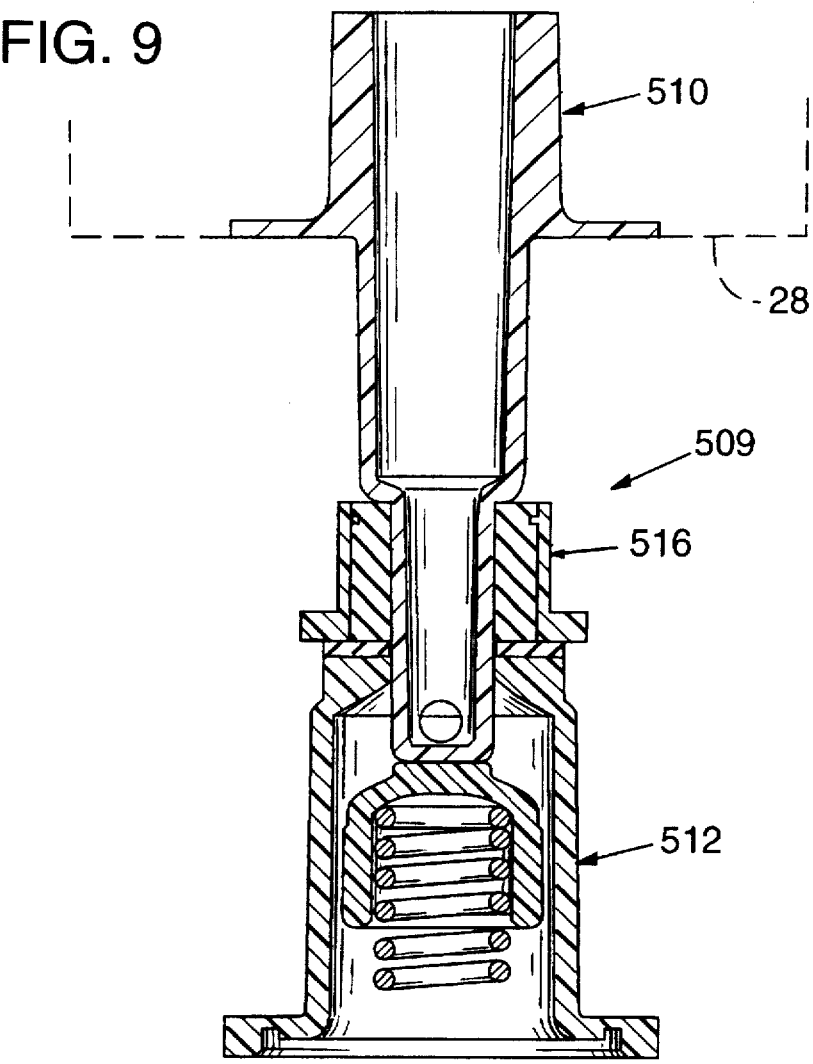
FIG. 9 is a cross-sectional view of a fifth embodiment of a self-sealing fluid interconnect in accordance with the current invention.

A fifth alternative embodiment of a fluid interconnect 509 is shown in FIG. 9. The fluid interconnect 509 has an outlet assembly 510, like outlet assembly 10 of the embodiment illustrated in FIGS. 1 and 2 but without a retaining ring 22. The fluid interconnect 509 also has an inlet assembly 512 like inlet assembly 12 but without the fingers 36. In this embodiment, the outlet valve 510 can function only once. The outlet and inlet assemblies 510 and 512 are opened in the same manner as the outlet and inlet assemblies 10 and 12 of the preferred embodiment. However, when the outlet assembly 510 is extracted from the inlet assembly 512, the sealing collar 516 is not moved back to the closed position. Rather, the sealing collar 516 remains open and the ink supply 28 must be discarded after one use. This embodiment is advantageous because it is simple and easy to recycle.

Figure 10:
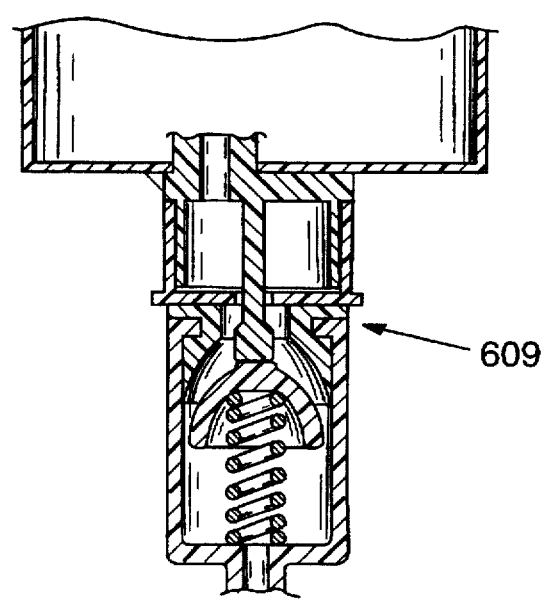
FIG. 10 is a cross-sectional view of a sixth embodiment of a self-sealing fluid interconnect of the current invention.

Similarly, a sixth embodiment of a fluid interconnect of the present invention is illustrated in FIG. 10 as reference number 609. The fluid interconnect 609 is essentially the fluid interconnect of FIGS. 3 and 4 without fingers and a retaining ring. This fluid interconnect 609 would be for one-time use and would function the same way as the fluid interconnect 509.

This description sets forth various examples of the present invention for purposes of illustration only. The description should not be construed to limit the scope of the invention in any way. Numerous other modifications and variations can be made to the invention without departing from the invention as defined by the appended claims and their equivalents.

The invention claimed is:

1. A fluid interconnect for connecting an ink supply to an ink-jet printer, the fluid interconnect comprising:
   an outlet assembly including a sealing member movable between a first position for occluding fluid flow through the outlet assembly and a second position for allowing fluid flow through the outlet assembly, a primary catch fixed to the sealing member, an actuator associated with the sealing member, and a guide member adjacent to at least a portion of the sealing member; and an inlet assembly for coupling with the outlet assembly, the inlet assembly including a fitment having an inlet aperture a seat movable within the fitment from a closed position in which the seat occludes fluid flow through the inlet aperture to an open position in which the seat does not occlude fluid flow through the inlet aperture, the seat being biased toward the closed position and movable into the open position by the actuator when the outlet assembly is coupled to the inlet assembly to allow fluid flow from the outlet assembly into the inlet assembly, and a compliant finger movable between an engaged position in which the compliant finger engages the primary catch and a disengaged position, the compliant finger positioned such that the guide member deflects the compliant finger from the disengaged position to the engaged position when the outlet assembly is coupled to the inlet assembly and such that the compliant finger moves the sealing member from the second position to the first position as the inlet assembly is uncoupled from the outlet assembly.

2. The fluid interconnect of claim 1 in which the outlet assembly further comprises a hollow tube, the hollow tube having an upper end in fluid communication with an ink supply, a closed lower end, and a lateral hole, the sealing member being positioned on the hollow tube such that in the first position the sealing member covers the lateral hole to prevent the flow of ink through the tube and the lower end of the hollow tube being the actuator.

3. The fluid interconnect of claim 1 in which the outlet assembly further comprises:

a valve body defining a cavity in fluid communication with an ink supply;

a projection extending from the cavity, the projection being the actuator; and in which the sealing member has an aperture for receiving the projection, the sealing member enclosing the cavity and defining the aperture that in the first position is sealed by the projection and in the second position allows the flow of ink from the cavity.

4. The fluid interconnect of claim 1 in which the seat is biased in a closed position by a spring.

5. The fluid interconnect of claim 1 further comprising a seal between the inlet and outlet assemblies.

6. The fluid interconnect of claim 1 in which the primary catch has a sloped surface and the finger has a sloped surface for engaging the sloped surface on the catch.

7. The fluid interconnect of claim 1 in which the guide member has a cam for guiding the finger into the engaged position.

8. The fluid interconnect of claim 1 in which the guide member has a cam for guiding the finger out of the engaged position, thereby leaving the sealing member in the first position.

9. The fluid interconnect of claim 1 further comprising a mechanism to move the sealing member from a position in which the outlet assembly is partially coupled with the inlet assembly to the first position, as the outlet assembly is uncoupled from the inlet assembly.

10. A fluid interconnect for connecting an ink supply to an ink-jet printer, the fluid interconnect comprising:

an outlet assembly including a sealing member movable between a first position for occluding fluid flow through the outlet assembly and a second position for allowing fluid flow through the outlet assembly, a primary catch fixed to the sealing member, an actuator associated with the sealing member, and a guide member adjacent to at least a portion of the sealing member; and an inlet assembly for coupling with the outlet assembly, the inlet assembly including a fitment having an inlet aperture a seat movable within the fitment from a closed position in which the seat occludes fluid flow through the inlet aperture to an open position in which the seat does not occlude fluid flow through the inlet aperture, the seat being biased toward the closed position and movable into the open position by the actuator when the outlet assembly is coupled to the inlet assembly to allow fluid flow from the outlet assembly into the inlet assembly, and a compliant finger movable between an engaged position in which the compliant finger engages the primary catch and a disengaged position, the compliant finger positioned such that the guide member deflects the compliant finger from the disengaged position to the engaged position when the outlet assembly is coupled to the inlet assembly and such that the compliant finger moves the sealing member from the second position to the first position as the inlet assembly is uncoupled from the outlet assembly; and further comprising a mechanism to move the sealing member from a position in which the outlet assembly is partially coupled with the inlet assembly to the first position, as the outlet assembly is uncoupled from the inlet assembly, the mechanism comprising:

a safety catch fixed to the sealing member;

a first tooth fixed to the finger;

a second tooth fixed to the finger; and the first tooth for catching the safety catch to move the sealing member from the partially coupled position to the first position as the outlet assembly is uncoupled from the inlet assembly.

11. A fluid interconnect for connecting an ink supply to an ink-jet printer, the fluid interconnect comprising:

an outlet assembly including a sealing member movable between a first position for occluding fluid flow through the outlet assembly and a second position for allowing fluid flow through the outlet assembly, a primary catch fixed to the sealing member, an actuator associated with the sealing member, and a guide member adjacent to at least a portion of the sealing member; and an inlet assembly for coupling with the outlet assembly, the inlet assembly including a fitment having an inlet aperture a seat movable within the fitment from a closed position in which the seat occludes fluid flow through the inlet aperture to an open position in which the seat does not occlude fluid flow through the inlet aperture, the seat being biased toward the closed position and movable into the open position by the actuator when the outlet assembly is coupled to the inlet assembly to allow fluid flow from the outlet assembly into the inlet assembly, and a compliant finger movable between an engaged position in which the compliant finger engages the primary catch and a disengaged position, the compliant finger positioned such that the guide member deflects the compliant finger from the disengaged position to the engaged position when the outlet assembly is coupled to the inlet assembly and such that the compliant finger moves the sealing member from the second position to the first position as the inlet assembly is uncoupled from the outlet assembly; and further comprising a mechanism to move the sealing member from a position in which the outlet assembly is partially coupled with the inlet assembly to the first position, as the outlet assembly is uncoupled from the inlet assembly, the mechanism comprising a second finger positioned to engage the primary catch when the outlet assembly is partially coupled to the inlet assembly and to move the sealing member from the partially coupled position to the first position as the outlet assembly is uncoupled from the inlet assembly.

12. The fluid interconnect of claim 1 further comprising a stop positioned adjacent to the actuator for ensuring that the sealing member stops in the first position as the outlet assembly is uncoupled from the inlet assembly.

13. An outlet assembly for an ink supply that is connectable to an inlet assembly on an ink-jet printer that has a compliant finger, the outlet assembly comprising:

a hollow tube having an upper end in fluid communication with the ink supply, a closed lower end, and a lateral hole;

a sealing collar positioned on the hollow tube and movable from a first position in which the sealing collar covers the lateral hole to prevent ink flow through the outlet assembly to a second position in which the sealing collar does not cover the lateral hole;

a primary catch fixed to the sealing collar; and a guide member positioned adjacent to at least a portion of the sealing collar, the guide member guiding the compliant finger to engage the primary catch upon insertion of the ink supply into the inlet assembly such that when the ink supply is extracted from the inlet assembly on the printer, the compliant finger returns the sealing collar to the first position.

14. The outlet assembly of claim 13 further comprising a seal between the inlet and outlet assemblies.

15. The outlet assembly of claim 13 in which the guide member has a stop to define the second position of the sealing collar.

16. An outlet assembly for an ink supply that is connectable to an inlet assembly on an ink-jet printer that has compliant finger, the outlet assembly comprising:

a valve body defining a cavity in fluid communication with the ink supply;

a projection extending from the cavity;

a sealing member enclosing the cavity, the sealing member having an aperture and being movable from a first position in which the projection seals the aperture to a second position in which the aperture is open to allow ink flow from the cavity;

a primary catch fixed to the sealing member; and a guide member positioned adjacent to at least a portion of the sealing member, the guide member guiding the compliant fingers to engage the primary catch upon insertion of the ink supply into the inlet assembly.

17. The outlet assembly of claim 16 further comprising a seal between the inlet and outlet assemblies.

18. A fluid interconnect for connecting an ink supply to an ink-jet printer, the fluid interconnect comprising:

an inlet assembly including a fitment having an inlet aperture, seat movable within the fitment from a closed position in which the seat occludes fluid flow through the inlet aperture to an open position in which the seat does not occlude fluid flow through the inlet aperture, the seat being biased toward the closed position; and an outlet assembly including an actuator and a sealing member positioned around the actuator, the actuator sized to move the seat from the closed position to the open position when the actuator is inserted into the aperture, the sealing member being moved relative to the actuator by the fitment as the actuator is inserted so that the sealing member moves from a first position in which the sealing member occludes the flow of ink from the outlet assembly into a second position in which the sealing member is away from the hole to allow the flow of ink through the actuator.

19. The fluid interconnect of claim 18 in which the outlet assembly further comprises a hollow tube, the hollow tube having an upper end in fluid communication with an ink supply and a lower end in which is formed a hole, the sealing member being positioned on the hollow tube such that in the first position the sealing member covers the hole to prevent the flow of ink through the tube; and wherein the lower end of the hollow tube defines the actuator.

20. The fluid interconnect of claim 18 in which the outlet assembly further comprises:

a valve body defining a cavity in fluid communication with an ink supply;

a projection extending from the cavity to define the actuator; and the sealing member having a hole in which fits a part of the projection to occlude the hole, the sealing member enclosing the cavity and movable relative to the valve body to permit the projection part to move out of the hole to open the cavity, thereby allowing the flow of ink from the cavity.

* * * * *